United States Patent
Iwaki et al.

(10) Patent No.: US 12,079,518 B2
(45) Date of Patent: Sep. 3, 2024

(54) MEMORY SYSTEM AND CONTROLLING METHOD WITH LOGICAL ADDRESS IDENTIFICATION AND INTERNAL DATA MANAGEMENT

(71) Applicant: Kioxia Corporation, Tokyo (JP)

(72) Inventors: Yasuyuki Iwaki, Kawasaki Kanagawa (JP); Koji Maruya, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 30 days.

(21) Appl. No.: 17/943,972

(22) Filed: Sep. 13, 2022

(65) Prior Publication Data
US 2023/0297284 A1     Sep. 21, 2023

(30) Foreign Application Priority Data
Mar. 18, 2022    (JP) .................................. 2022-044347

(51) Int. Cl.
*G06F 3/06*        (2006.01)

(52) U.S. Cl.
CPC .......... *G06F 3/0659* (2013.01); *G06F 3/0607* (2013.01); *G06F 3/0658* (2013.01); *G06F 3/0679* (2013.01)

(58) Field of Classification Search
CPC .... G06F 3/0659; G06F 3/0658; G06F 3/0607; G06F 3/0679
See application file for complete search history.

(56) References Cited

U.S. PATENT DOCUMENTS

| | | | |
|---|---|---|---|
| 9,710,167 B2 | 7/2017 | Liu et al. | |
| 2015/0286581 A1* | 10/2015 | Lee | G06F 12/1408 |
| | | | 713/189 |
| 2016/0124643 A1 | 5/2016 | Liu et al. | |
| 2016/0306590 A1* | 10/2016 | Kang | G06F 3/0608 |
| 2017/0139823 A1 | 5/2017 | Tomlin et al. | |
| 2018/0267746 A1 | 9/2018 | Itoh et al. | |
| 2020/0364157 A1* | 11/2020 | Byun | G06F 12/0868 |
| 2021/0034536 A1* | 2/2021 | Kim | G06F 13/1673 |
| 2021/0272629 A1 | 9/2021 | Peddle et al. | |
| 2022/0083273 A1 | 3/2022 | Saito | |
| 2023/0221875 A1* | 7/2023 | Moon | G06F 3/064 |
| | | | 711/112 |

FOREIGN PATENT DOCUMENTS

JP     2018-156137 A     10/2018

* cited by examiner

*Primary Examiner* — Edward J Dudek, Jr.
(74) *Attorney, Agent, or Firm* — Foley & Lardner LLP

(57) ABSTRACT

According to one embodiment, a controller writes first data into a first storage area in accordance with a first write command from a host. The controller identifies a logical address mapped to the written first data. The controller writes internal data that is read from a second storage area into a first location of the first storage area. The controller associates the first storage location with the logical address. The controller reads the internal data from the first storage location in response to receiving, from the host, a read command that designates the logical address. The controller transmits, to the host, the internal data read from the first storage location.

20 Claims, 15 Drawing Sheets

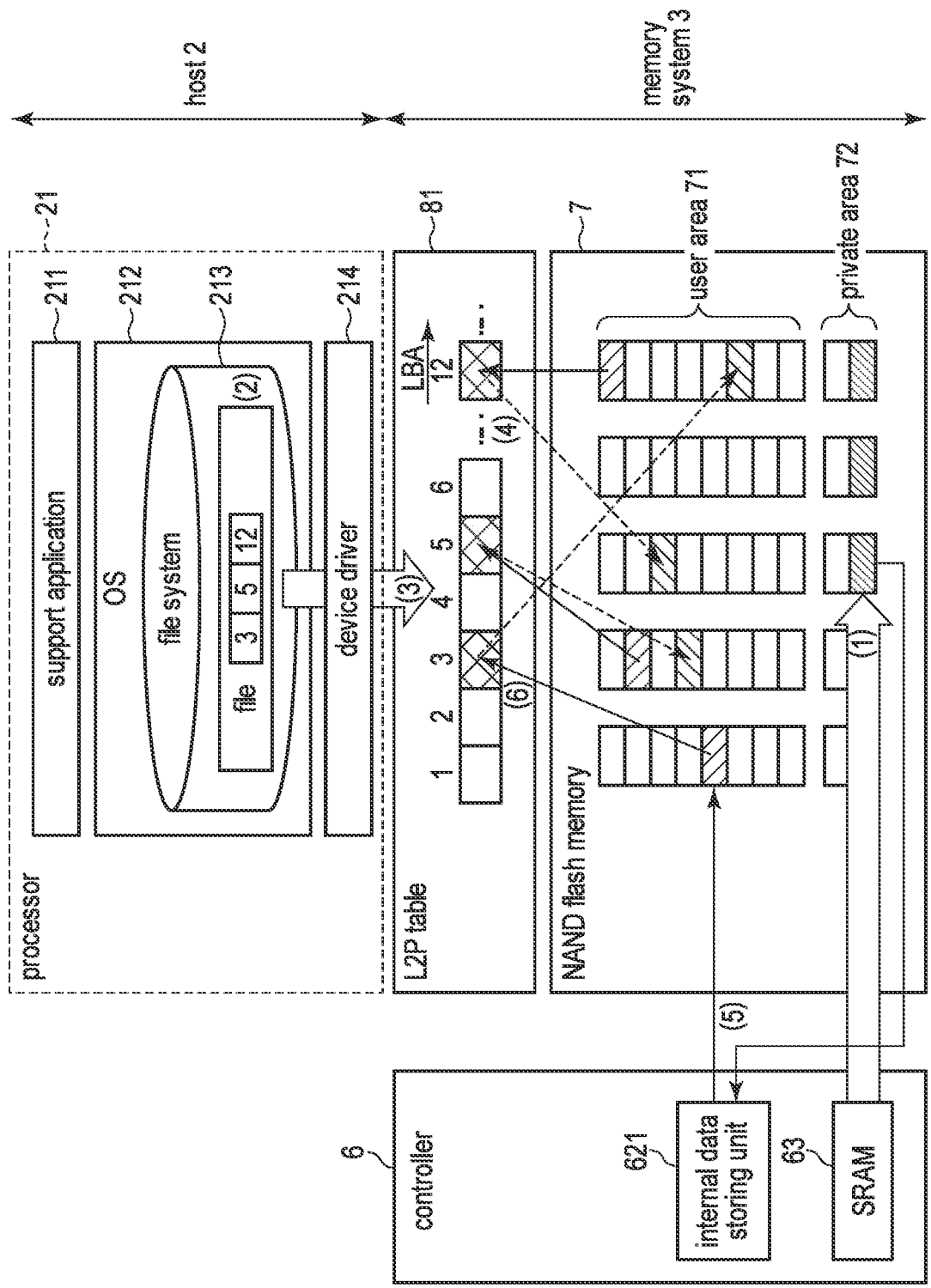
F I G. 5

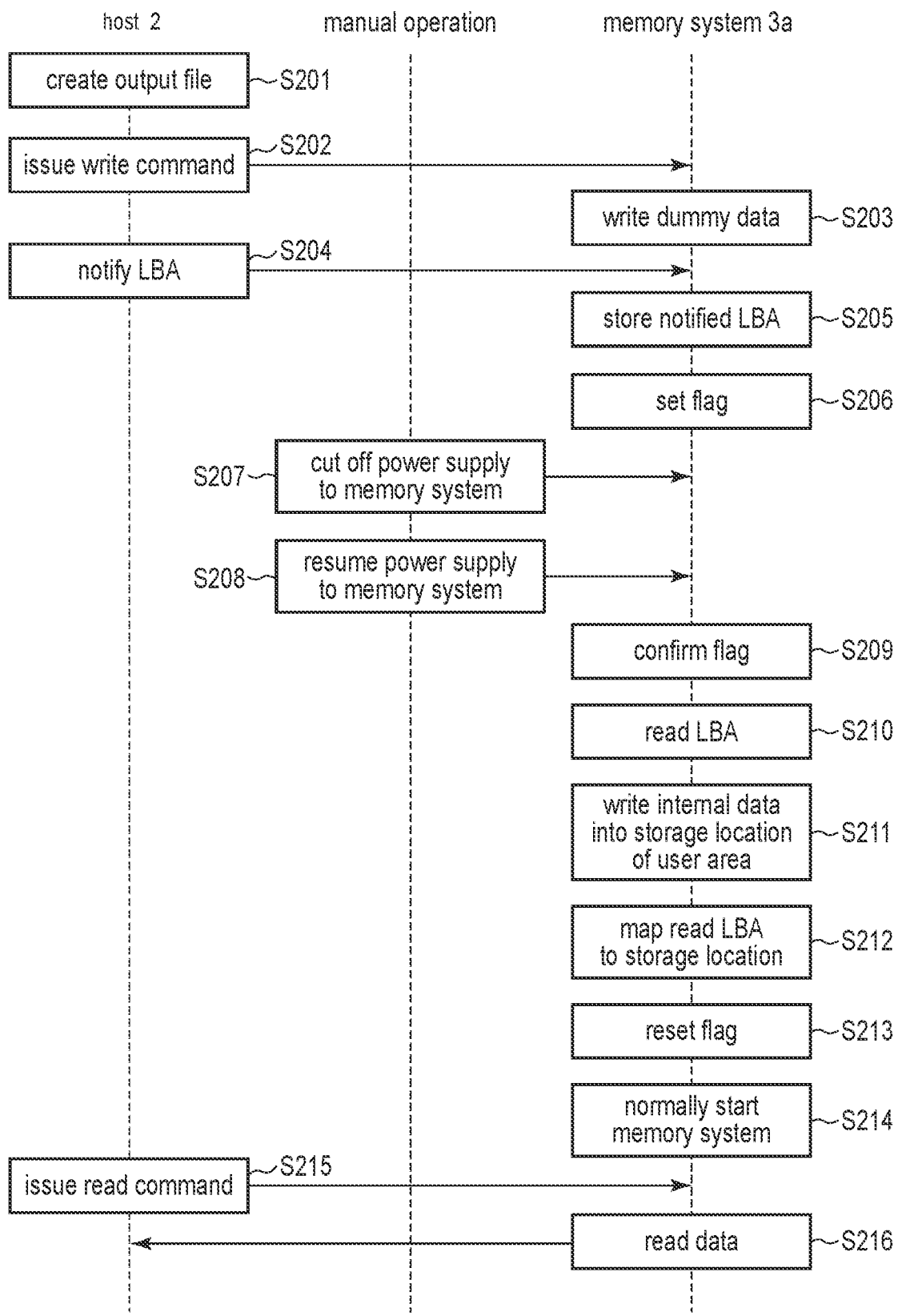
F I G. 9

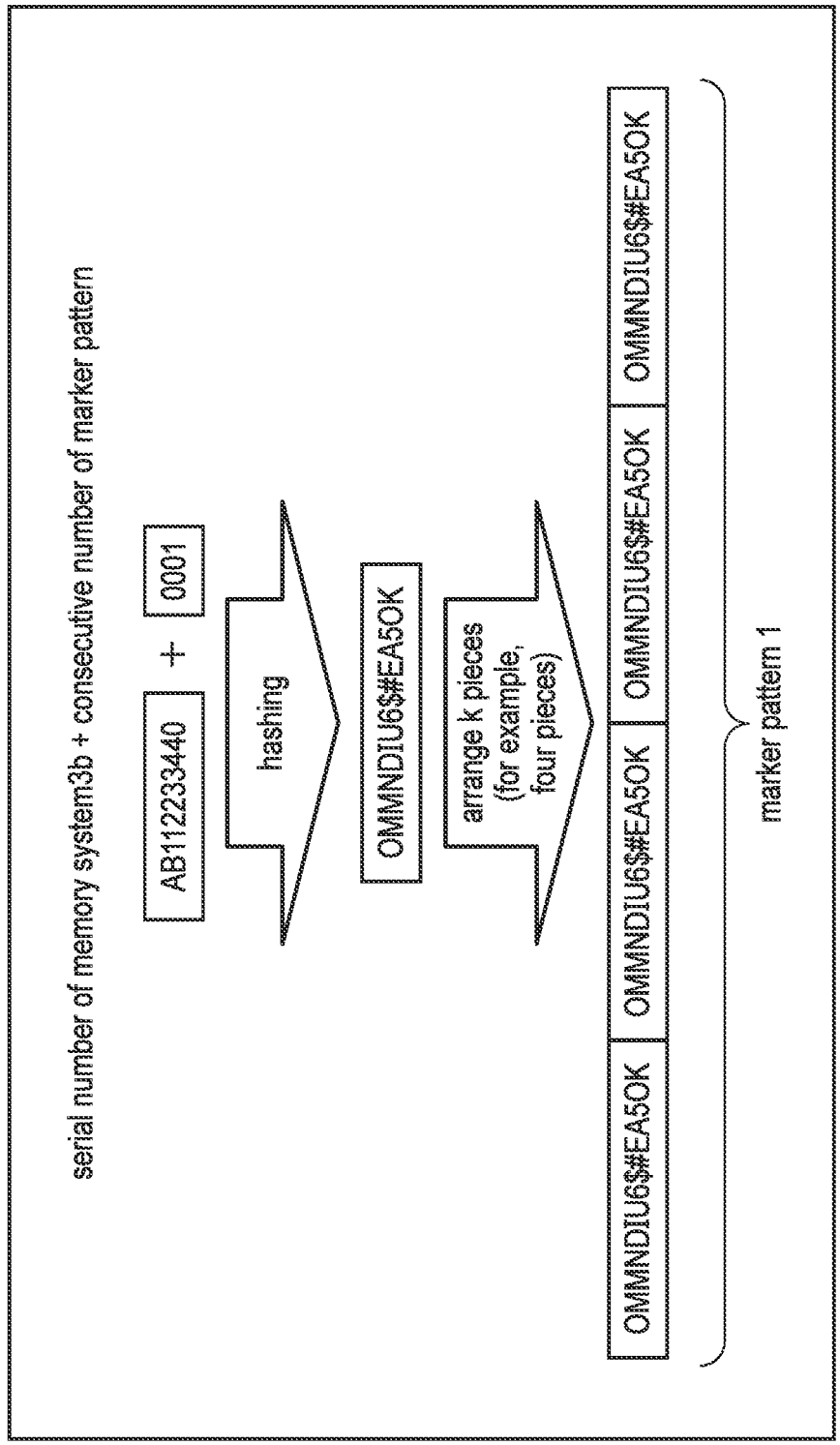
F I G. 12

| pattern number | marker pattern | location |
|---|---|---|
| 1 | XXXXXXXXXXXX | LBA3 0 |
| 2 | XXXXXXXXXXXX | LBA3 1 |
| 3 | XXXXXXXXXXXX | LBA3 2 |
| 4 | XXXXXXXXXXXX | LBA3 3 |
| ⋮ | ⋮ | ⋮ |
| M | XXXXXXXXXXXX | LBA12 2 |

} uninterruptedly detect

FIG. 13

MEMORY SYSTEM AND CONTROLLING METHOD WITH LOGICAL ADDRESS IDENTIFICATION AND INTERNAL DATA MANAGEMENT

CROSS-REFERENCE TO RELATED APPLICATIONS

This application is based upon and claims the benefit of priority from Japanese Patent Application No. 2022-044347, filed Mar. 18, 2022, the entire contents of which are incorporated herein by reference.

FIELD

Embodiments described herein relate generally to a memory system and a controlling method.

BACKGROUND

In recent years, memory systems that include nonvolatile memories are widely used. As one of such memory systems, a solid state drive (SSD) that includes a NAND flash memory is known.

For maintenance or management of a memory system such as an SSD, the host may acquire internal data of the memory system, and the acquired internal data may be used for analysis.

As a method enabling the host to acquire the internal data of the memory system, a method may be used in which a vendor-specific command, which is a command specific to a vendor of the memory system, is transmitted to the memory system.

The vendor-specific command is not supported by standard device drivers of normal general-purpose operating systems. For this reason, the host is required to prepare a dedicated program which supports the vendor-specific command.

If out-of-band communication is used, it is possible to communicate with the memory system without depending on the environment of the operating system of the host. However, the communication speed of the out-of-band communication is normally low. Therefore, when the size of the internal data is relatively large, it takes a long time to acquire the internal data.

BRIEF DESCRIPTION OF THE DRAWINGS

FIG. 5 illustrates an example of an internal data storing operation that is executed in the memory system according to the first embodiment.

FIG. 9 is a sequence diagram illustrating a procedure of an internal data provision operation that is executed in the memory system according to the second embodiment.

FIG. 12 illustrates an example of a marker pattern that is used in the memory system according to the third embodiment.

FIG. 13 illustrates an example of a configuration of a pattern table that is used in the memory system according to the third embodiment.

DETAILED DESCRIPTION

In general, according to one embodiment, a memory system is connectable to a host. The memory system comprises a nonvolatile memory and a controller. The nonvolatile memory includes a first storage area and a second storage area. The first storage area stores user data based on a command that designates a logical address from the host. The second storage area stores management data. The controller is configured to control the nonvolatile memory. The controller writes first data into the first storage area in accordance with a first write command from the host. The controller identifies a logical address mapped to the written first data. The controller reads, from the second storage area, internal data that is included in the management data and is generated by the controller. The controller writes the read internal data into a first storage location of the first storage area. The controller associates the first storage location with the identified logical address. The controller reads the internal data from the first storage location in response to receiving, from the host, a read command that designates the identified logical address. The controller transmits, to the host, the internal data read from the first storage location.

Hereinafter, embodiments will be described with reference to accompanying drawings.

First Embodiment

Figure 1:
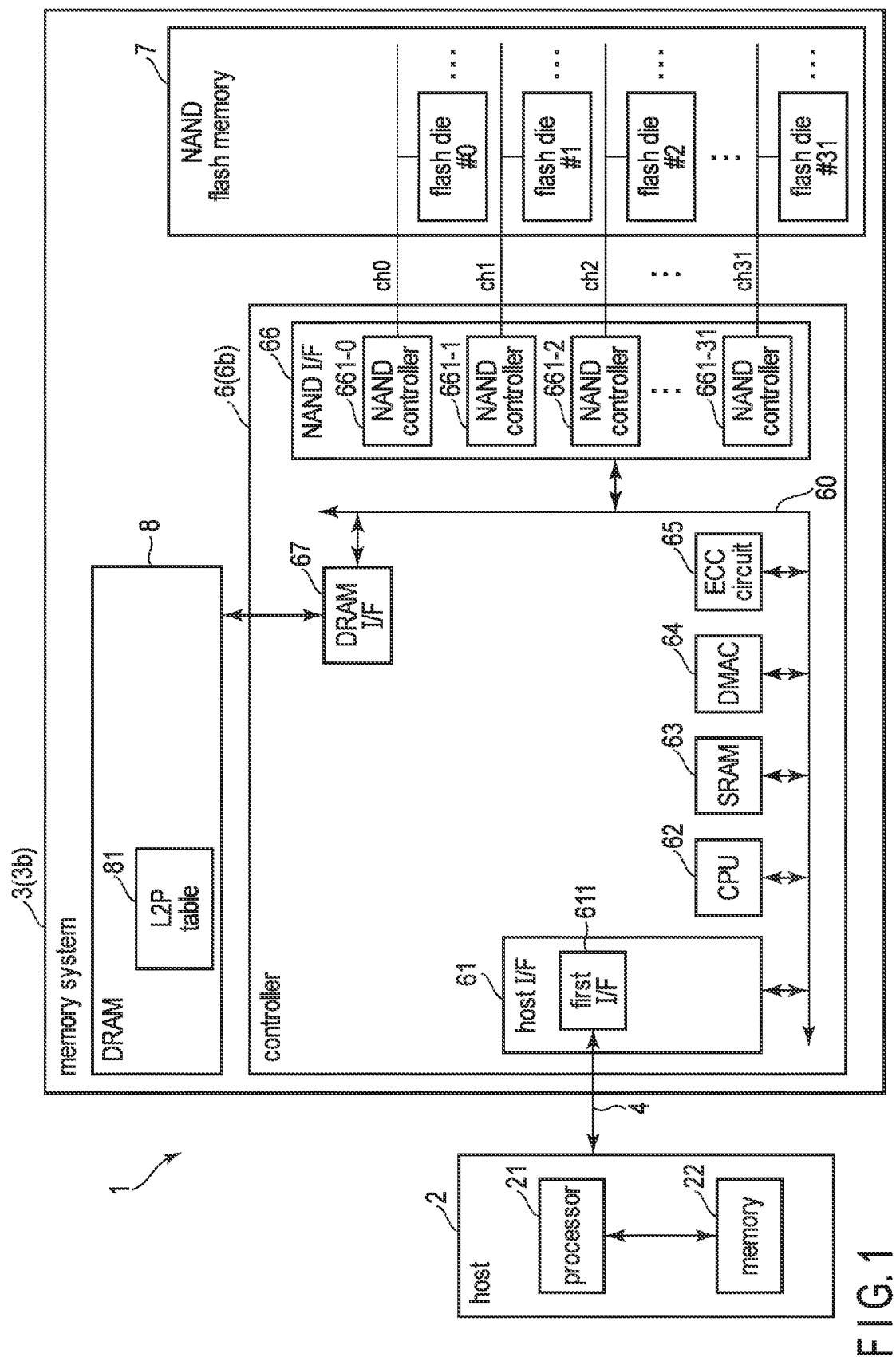
FIG. 1 is a block diagram illustrating an example of a configuration of an information processing system that includes a memory system according to a first embodiment.

FIG. 1 is a block diagram illustrating an example of a configuration of an information processing system 1 which includes a memory system 3 according to a first embodiment. The memory system 3 according to the first embodiment is a storage device that includes a nonvolatile memory.

The information processing system 1 includes a host (host device) 2 and the memory system 3. The host 2 and the memory system 3 are connectable through a first bus 4. Communication between the host 2 and the memory system 3 through the first bus 4 is executed in conformity with, for example, the NVM Express™ (NVMe™) standard or the Serial Attached SCSI (SAS) standard.

The host 2 is an information processing device. The host 2 is, for example, a personal computer or a server computer. The host 2 accesses the memory system 3. For example, the host 2 transmits a write command, which is a command for writing data, to the memory system 3. Further, the host 2 transmits a read command, which is a command for reading data, to the memory system 3.

The memory system 3 is a semiconductor storage device. The memory system 3 is, for example, an SSD that includes a NAND flash memory 7, which is an example of a nonvolatile memory. The memory system 3 writes data to the nonvolatile memory. In addition, the memory system 3 reads data from the nonvolatile memory.

The first bus 4 conforms to, for example, PCI Express™ (PCIe™) standard. The first bus 4 is mainly used for transmission of data and input/output (I/O) commands from the host 2 to the memory system 3, and for transmission of data and responses from the memory system 3 to the host 2. Each of the I/O commands is a command for writing or reading data to or from the nonvolatile memory. The I/O commands include, for example, a write command and a read command.

Next, an internal configuration of the host 2 will then be described. The host 2 includes a processor 21 and a memory 22.

The processor 21 is a central processing unit (CPU). The processor 21 communicates with the memory system 3 through the first bus 4. The processor 21 executes a software (host software) that is loaded onto the memory 22. The host software is loaded onto the memory 22 from the memory system 3 or from another storage device included in or connected to the host 2. The host software includes an operating system, a file system, a device driver, and an application program.

The memory 22 is a volatile memory. The memory 22 is, for example, a random access memory such as a dynamic random access memory (DRAM).

Next, an internal configuration of the memory system 3 will be described. The memory system 3 includes a controller 6, a NAND flash memory (hereinafter, simply referred to as the NAND memory) 7, and a dynamic random access memory (DRAM) 8.

The controller 6 is a memory controller which is an example of a control circuit. The controller 6 is, for example, a semiconductor device such as a system-on-a-chip (SoC). The controller 6 is communicably connected to the NAND memory 7. The controller 6 executes writing of data to the NAND memory 7 and reading of data from the NAND memory 7. The controller 6 is also communicably connected to the DRAM 8. The controller 6 executes writing of data to the DRAM 8 and reading of data from the DRAM 8. In addition, the controller 6 executes communication with the host 2 through the first bus 4.

The NAND memory 7 is a nonvolatile memory. The NAND memory 7 is, for example, a flash memory having a two-dimensional structure or a flash memory having a three-dimensional structure. The NAND memory 7 includes a plurality of blocks. A block is a minimum unit of erasing data stored in the NAND memory 7.

The DRAM 8 is a volatile memory. The DRAM 8 stores, for example, a logical-to-physical address translation table (logical-to-physical translation table: L2P table) 81. The L2P table 81 is a table that stores mapping information indicating relationship between each logical address and each physical address. A logical address is, for example, a logical block address (LBA). A physical address is an address indicating a physical storage location in the NAND memory 7.

An internal configuration of the controller 6 will then be described. The controller 6 includes a host interface (host I/F) 61, a CPU 62, a static RAM (SRAM) 63, a direct memory access controller (DMAC) 64, an ECC circuit 65, a NAND interface (NAND I/F) 66, and a DRAM interface (DRAM I/F) 67. These units are connected to an internal bus 60.

The host interface 61 is a hardware interface circuit. The host interface 61 executes communication with the host 2.

The CPU 62 is a processor. The CPU 62 controls the host interface 61, the SRAM 56, the DMAC 64, the ECC circuit 65, the NAND interface 66, and the DRAM interface 67. The CPU 62 loads control programs (firmware) from the ROM (not illustrated) or the NAND memory 7 onto the SRAM 63 or the DRAM 8. The CPU 62 performs various processing by executing the control programs (firmware). For example, the CPU 62 executes management of data stored in the NAND memory 7 and management of blocks included in the NAND memory 7 as a flash translation layer (FTL). The management of data stored in the NAND memory 7 includes, for example, management of mapping information indicating relationship between each logical address and each physical address. The CPU 62 manages mapping between logical addresses and physical addresses by using the L2P table 81. In addition, the management of the blocks included in the NAND memory 7 includes, for example, management of defective blocks (bad blocks) included in the NAND memory 7, a wear leveling, and a garbage collection.

The SRAM 63 is a volatile memory. The SRAM 63 is used as, for example, a write buffer that temporarily stores write data received from the host 2. The SRAM 63 is also used as a working area of the firmware executed by the CPU 62. Instead of or in addition to the SRAM 63, a DRAM may be utilized.

The DMAC 64 is a circuit that executes direct memory access (DMA). The DMAC 64 executes data transfer between the memory 22 of the host 2 and the DRAM 8 or the SRAM 63.

The ECC circuit 65 is a circuit that executes data encoding and data decoding. Before data is written to the NAND memory 7, the ECC circuit 65 executes encoding to add an error correction code (ECC) as a redundant code to the data to be written. When data is read from the NAND memory 7, the ECC circuit 65 executes decoding to perform error correction on the read data by using an ECC added to the read data.

The NAND interface 66 is a circuit that controls the NAND memory 7. The NAND interface 66 includes NAND controllers 661-0, 661-1, 661-2, . . . , and 661-31. Each of the NAND controllers 661-0, 661-1, 661-2, . . . , and 661-31 is connected to one or more flash dies through the channels ch0, ch1, ch2, . . . , and ch31, respectively. The flash dies are also referred to as flash chips. The NAND controllers 661-0, 661-1, 661-2, . . . , and 661-31 control, for example, the flash die #0, the flash die #1, the flash die #2, . . . , and the flash die #31, respectively, that are included in the NAND memory 7. Each of the NAND controllers 661-0, 661-1, 661-2, . . . , and 661-31 has the same configuration.

The DRAM interface 67 is a circuit that controls the DRAM 8. The DRAM interface 67 writes data to the DRAM 8. The DRAM interface 67 also reads data from the DRAM 8.

Next, information stored in the DRAM 8 will be described. The information stored in the DRAM 8 includes the L2P table 81.

The L2P table 81 manages the mapping between each logical address and each physical address with a certain size such as a sector.

Next, an internal configuration of the host interface 61 will be described. The host interface 61 includes a first interface 611.

The first interface 611 is, for example, an interface circuit that controls communication with the host 2 in conformity with the PCIe™ standard. The first interface 611 transmits and receives I/O commands, data, and responses to and from the host 2 through the first bus 4. Communication between the host 2 and the memory system 3 as executed by the first interface 611 through the first bus 4 is referred to as in-band communication.

Figure 2:
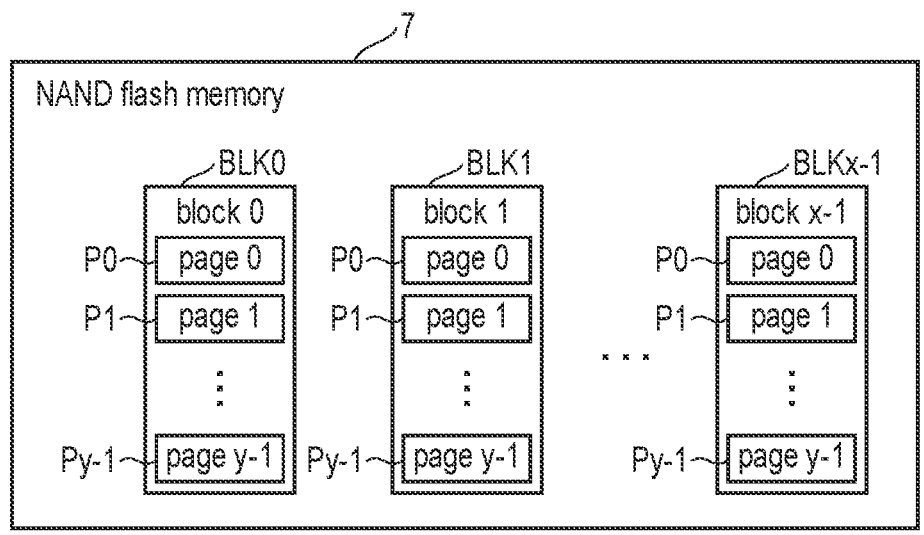
FIG. 2 is a block diagram illustrating an example of a configuration of a NAND flash memory included in the memory system according to the first embodiment.

Next, an example of a configuration of the NAND memory 7 will be described. FIG. 2 is a block diagram illustrating an example of a configuration of the NAND memory 7 included in the memory system 3 according to the embodiment.

The NAND memory 7 includes a plurality of physical blocks BLK0 to BLKx−1. Each of the physical blocks BLK0 to BLKx−1 is a minimum unit of a data erase operation on the NAND memory 7. The data erase operation is an operation to erase part of data stored in the NAND memory 7. Each of the physical blocks BLK0 to BLKx−1 is also referred to as an erase block, a flash block, or a memory block. Each of the physical blocks BLK0 to BLKx−1 includes a plurality of pages P0 to Py−1. Each of the pages P0 to Py−1 is a minimum unit of a data write operation and a data read operation to the NAND memory 7. The data write operation is an operation for writing data. The data read operation is an operation for reading data. The pages P0 to Py−1 each include a plurality of memory cells connected to the same word line.

Figure 3:
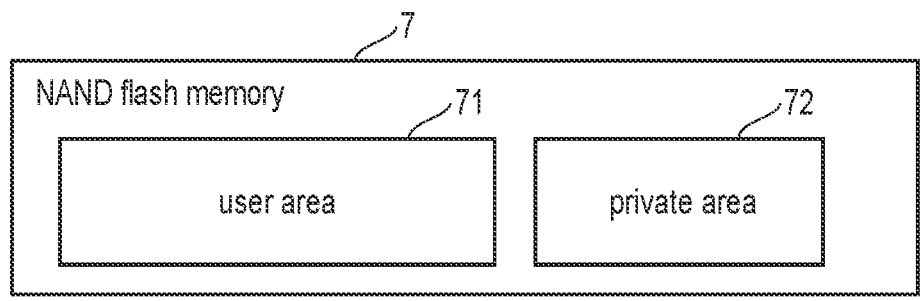
FIG. 3 is a block diagram illustrating storage areas in the NAND flash memory included in the memory system according to the first embodiment.

Next, storage areas included in the NAND memory 7 will be described. FIG. 3 is a block diagram illustrating a plurality of storage areas in the NAND memory 7 included in the memory system 3 according to the first embodiment. The NAND memory 7 includes a user area 71 and a private area 72.

The user area 71 is a storage area that stores user data. The user data is data accessed from the host 2 on the basis of an I/O command designating a logical address.

The private area 72 is a storage area that stores management data. The management data is data used for management of the memory system 3. The management data includes, for example, the L2P table 81 and block management information indicating the state of each block. The internal data generated by the controller 6 is also stored in the private area 72 as part of the management data. The internal data is, for example, internal information of the memory system 3 which is used to analyze error of the memory system 3. More specifically, the internal data is, for example, a set of data that includes log information managed by the firmware, register values, and a memory image of the SRAM 63 or the DRAM 8. The internal data is stored in the SRAM 63 by the controller 6, for example. Then, the internal data stored in the SRAM 63 is periodically written into the private area 72 by the controller 6, for example.

Figure 4:
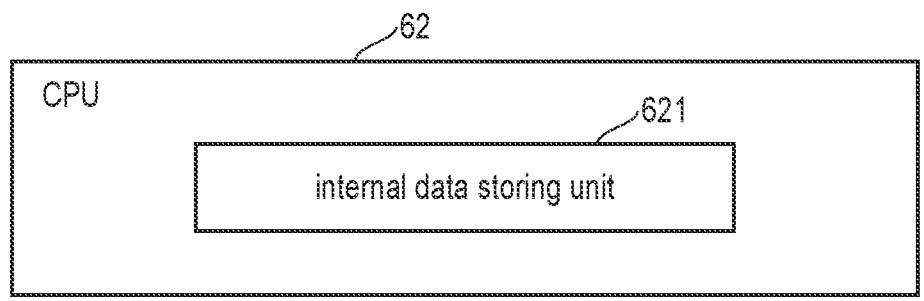
FIG. 4 is a block diagram illustrating an example of a functional configuration of a CPU included in a controller of the memory system according to the first embodiment.

Next, an example of a functional configuration of the CPU 62 will be described. FIG. 4 illustrates an example of a functional configuration of the CPU 62 included in the controller 6 of the memory system 3 according to the first embodiment.

The CPU 62 includes an internal data storing unit 621.

The internal data storing unit 621 executes an internal data storing operation. The internal data storing operation includes an operation to read internal data stored in the private area 72 and an operation to write the read internal data into the user area 71. The internal data written in the user area 71 is read by the host 2 on the basis of an input/output command designating a logical address, similarly to other user data.

Next, an operation to store the internal data in the NAND memory 7 will be described. FIG. 5 illustrates an example of an internal data storing operation that is executed in the memory system 3 according to the first embodiment.

(1) The controller 6 writes the internal data stored in the SRAM 63 into the private area 72 of the NAND memory 7. The controller 6 may periodically execute this write operation.

(2) The processor 21 creates a file (hereinafter referred to as an output file) which is necessary to acquire the internal data from the user area 71. In creating the output file, first, the application program (hereinafter referred to as the support application) 211 issues a request to the operating system (OS) 212 to create the output file. The OS 212 that has received the request creates, as the output file, a new file managed by the file system 213. The OS 212 transmits a file identifier indicating the created new file (output file) to the support application 211. The support application 211 prepares write data to be written into the output file. The write data to be written into the output file is, for example, dummy data or a plurality of marker blocks described later. The support application 211 issues a request to the OS 212 to write the output file into the memory system 3. The file system 213 maps a logical address space which includes one or more free logical addresses (here, an LBA 3, an LBA 5, and an LBA 12) which have not been mapped to other files, to the output file on the basis of an instruction from the OS 212. The number of LBAs included in the logical address space is determined by the size of the output file. The size of the output file corresponds to the maximum size of the internal data.

(3) The processor 21 transmits, to the memory system 3, one or more write commands for writing, into the memory system 3, the write data (dummy data or marker blocks) corresponding to the output file. For example, when the LBA 3, the LBA 5, and the LBA 12 are mapped to the write data of the output file, the processor 21 issues, to the memory system 3, a write command designating the LBA 3, a write command designating the LBA 5, and a write command designating the LBA 12. In this case, the OS 212 issues a request to the device driver 214 to write the write data corresponding to the output file into the memory system 3. The device driver 214 generates write commands that designate the LBAs, respectively, that are mapped to the output file (write data). The device driver 214 then issues the generated write commands to the memory system 3. These write commands are write commands instructing that the dummy data or the marker blocks be written into the NAND memory 7.

(4) The controller 6 receives the write commands from the host 2. The controller 6 maps, to each LBA designated by the received write commands, a certain storage location in the user area 71. The controller 6 writes the write data associated with the write commands into the mapped storage locations. The L2P table 81 stores correspondence relationships between the logical addresses (LBA) and physical addresses (PBA) indicating the storage locations.

(5) The internal data storing unit 621 reads the internal data stored in the private area 72. The internal data storing unit 621 then writes the read internal data into storage locations of the user area 71.

(6) The controller 6 identifies the LBAs (LBA 3, LBA 5, LBA 12) mapped to the write data of the output file written in the user area 71. The controller 6 maps the identified LBAs (LBA 3, LBA 5, LBA 12) to the respective storage locations where the internal data has been written. The L2P table 81 updates the stored correspondence relationships between the PBAs and the LBAs.

As a result, when read commands designating the respective LBAs (LBA 3, LBA 5, LBA 12) mapped to the output file is received from the host 2, the controller 6 reads the internal data from the user area 71. The controller 6 then transmits the read internal data to the host 2 as a response to the received read commands. In the processing to transmit the read commands to the memory system 3, the support application 211 issues a request to the OS 212 to open and read the output file. In response to this request, the OS 212 refers to the file management information managed by the file system 213 to identify the LBAs (LBA 3, LBA 5, LBA 12) mapped to the output file. The OS 212 issues a request to the device driver 214 to read the output file. In response to this request, the device driver 214 generates the read commands designating the LBA space mapped to the output file. Here, the device driver 214 generates a read command designating the LBA 3, a read command designating the LBA 5, and a read command designating the LBA 12. The device driver 214 transmits the generated read commands to the memory system 3.

Figure 6:
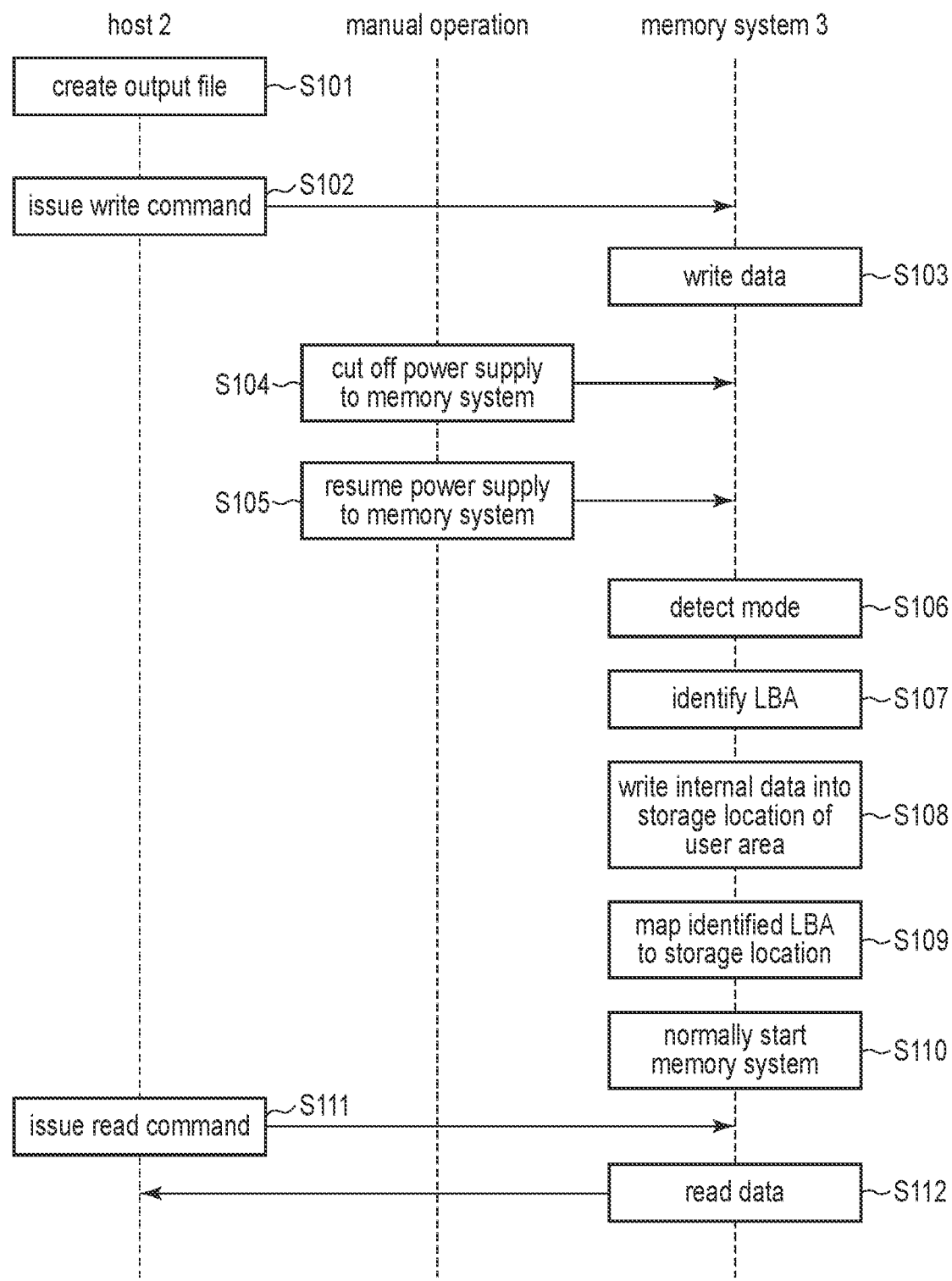
FIG. 6 is a sequence diagram illustrating a procedure of an internal data provision operation that is executed in the memory system according to the first embodiment.

Next, a procedure of an operation to provide the internal data to the host 2 will be described. FIG. 6 is a sequence diagram illustrating a procedure of an internal data provision operation that is executed in the memory system 3 according to the first embodiment.

The host 2 creates an output file (S101). The host 2 may determine the size of the output file on the basis of the size of the internal data to be received from the memory system 3. Specifically, the host 2 generates an output file having a size greater than or equal to a maximum size of internal data defined in advance.

The host 2 issues a write command to the memory system 3 (S102). The write command designates a logical address space (for example, one or more LBAs) mapped to write data corresponding to the output file. In addition, the host 2 may issue a plurality of write commands. Each of the plurality of write commands designates any of logical addresses included in the logical address space.

The controller 6 of the memory system 3 executes writing of the write data associated with the write command in accordance with the received write command (S103). The controller 6 writes the write data associated with the write command into a storage location of the user area 71. The controller 6 maps the logical address space, which is mapped to the write data, to the storage location. In other words, the controller 6 maps the LBA, which is designated by the write command, with the storage location.

According to a manual operation, power supply to the memory system 3 is cut off (S104).

According to a manual operation, power supply to the memory system 3 is resumed (S105).

The controller 6 detects an internal data storing mode for writing the internal data from the private area 72 to the user area 71 (S106). In this case, the controller 6 may detect the internal data storing mode from a specific operation at the time of the manual operation in S105. Alternatively, the controller 6 may detect the internal data storing mode by referring to a flag that is set before the power supply is cut off in S104.

The controller 6 identifies an LBA associated with the write command issued in S102 (S107). The controller 6 may identify the LBA by using a certain method. Specific examples of the method for identifying the LBA will be described later in a second embodiment and a third embodiment.

The controller 6 writes internal data to a storage location of the user area 71 (S108). In this case, the controller 6 reads the internal data from the private area 72. The controller 6 writes the read internal data into the user area 71.

The controller 6 maps the LBA identified in S107 to the storage location where the internal data is written in S108 (S109). As a result, the controller 6 associates the storage location where the internal data is written with the identified LBA.

The controller 6 executes an initialization operation of the memory system 3 to normally start the memory system 3 (S110). The memory system 3 becomes capable of receiving an I/O command from the host 2 and transmitting a response to the host 2.

The host 2 issues a read command to the memory system 3 (S111). The read command designates the logical address space which is mapped to the output file. In addition, the host 2 may issue a plurality of read commands to the memory system 3. Each of the plurality of read commands designates any of the LBAs included in the logical address space mapped to the output file.

In response to receiving the read command from the host 2, the controller 6 reads the internal data (S112). In this case, the controller 6 reads the internal data from the storage location that corresponds to the logical address designated by the received read command. The controller 6 then transmits the read internal data to the host 2 as a response to the received read command.

As described above, according to the first embodiment, the memory system 3 can provide the internal data to the host 2 by a communication in accordance with I/O commands. Therefore, even when the host 2 does not have an environment in which a vendor-specific command can be issued to the memory system 3, the memory system 3 can efficiently provide the internal data to the host 2.

Second Embodiment

Figure 7:
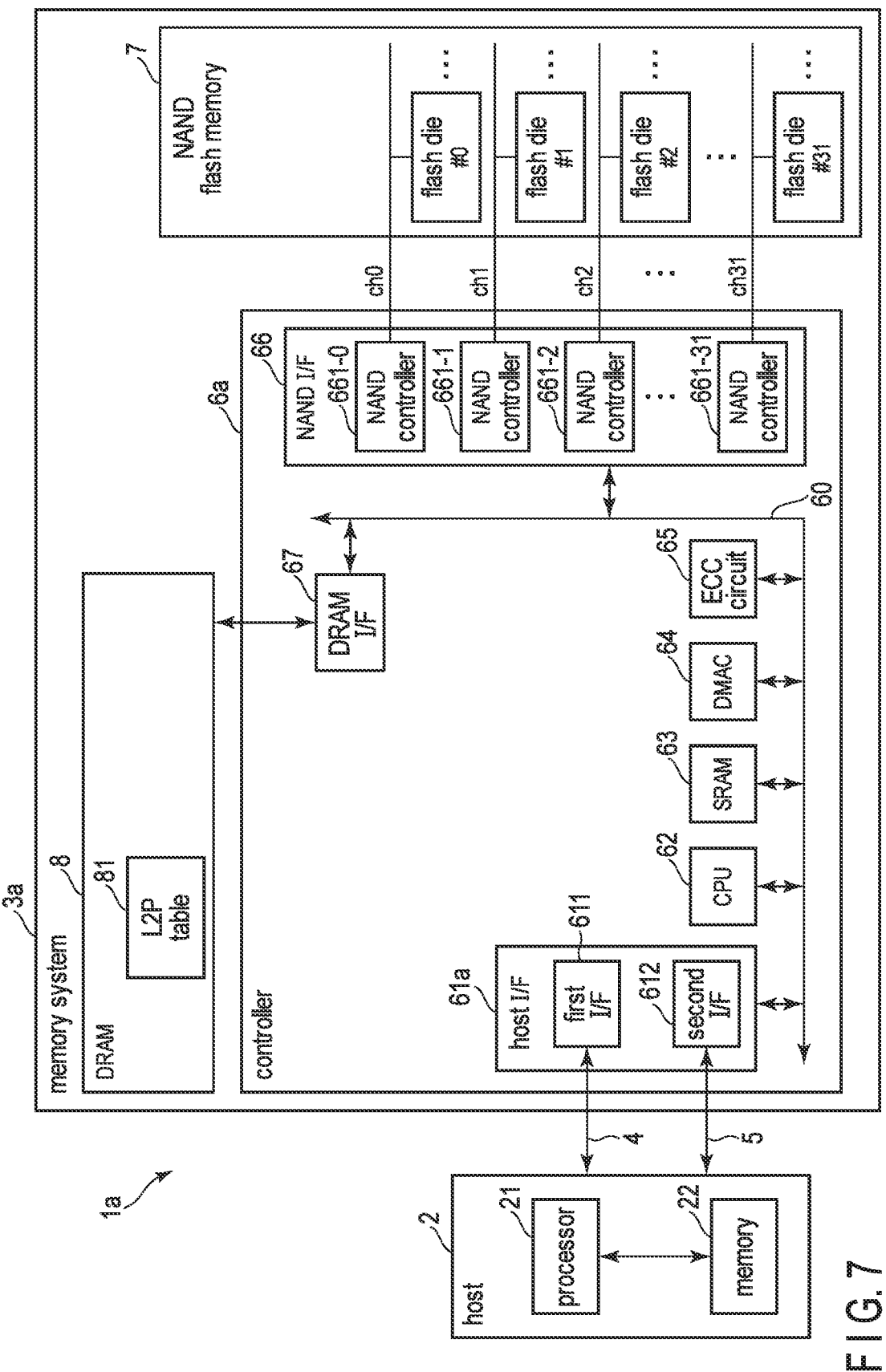
FIG. 7 is a block diagram illustrating an example of a configuration of an information processing system that includes a memory system according to a second embodiment.

The second embodiment will be described next. FIG. 7 is a block diagram illustrating an example of a configuration of an information processing system 1a which includes a memory system 3a according to the second embodiment.

Almost all components of the memory system 3a according to the second embodiment are the same as those of the memory system 3 according to the first embodiment described in FIG. 1. Therefore, the description will focus on points which are different from the memory system 3 according to the first embodiment.

The memory system 3a according to the second embodiment is capable of connecting to the host 2 through a second bus 5 in addition to the first bus 4.

The second bus 5 is a bus that conforms to the universal asynchronous receiver/transmitter (UART) standard. The second bus 5 is mainly used for maintenance of the memory system 3a or the like.

Next, an internal configuration of a host interface 61a will be described. The host interface 61a further includes a second interface 612 in addition to the first interface 611.

The second interface 612 is an interface circuit that controls communication with the host 2 in conformity with, for example, the UART standard.

Communication between the host 2 and the memory system 3a as executed by the second interface 612 through the second bus 5 is referred to as out-of-band communication.

Figure 8:
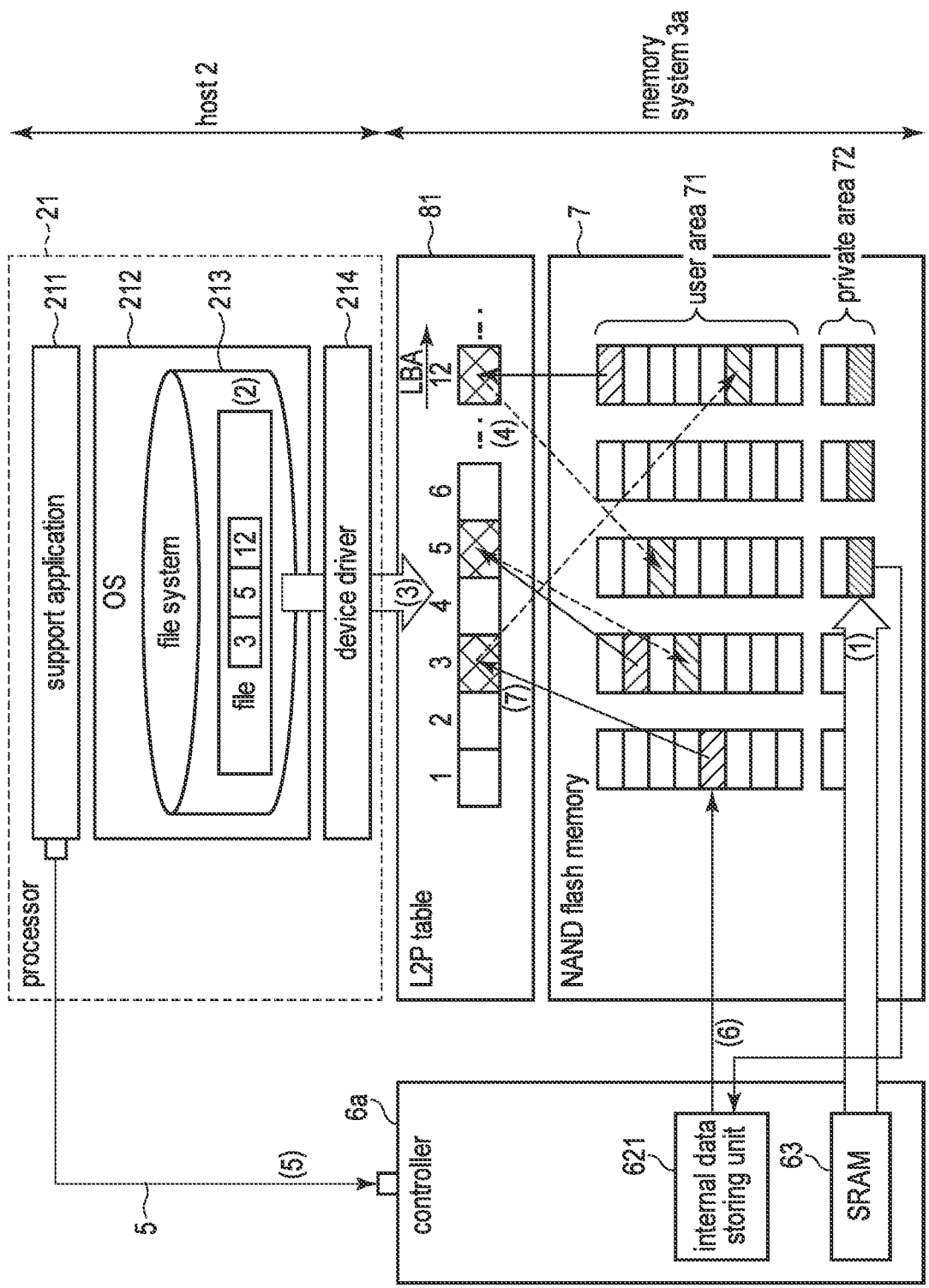
FIG. 8 illustrates an example of an internal data storing operation that is executed in the memory system according to the second embodiment.

Next, an operation to store internal data to the NAND memory 7 in the memory system 3a according to the second embodiment will be described. FIG. 8 illustrates an example of an internal data storing operation that is executed in the memory system 3a according to the second embodiment. Because processing of (1) to (4) in FIG. 8 is almost the same as the processing of (1) to (4) in FIG. 5, a description thereof is omitted here. Note that the write data prepared by the support application 211 in the processing of (2) is dummy data.

(5) The processor 21 transmits information indicating the logical address space mapped to the output file, to the controller 6a through the second bus 5. In this case, the support application 211 refers to the file management information managed by the file system 213 to identify the logical address space (here, the LBA 3, the LBA 5, and the LBA 12) mapped to the write data of the output file. The support application 211 then prepares transmission data which includes information indicating the logical address space. In response to a transmission request from the support application 211, the processor 21 transmits the transmission data (information indicating the logical address space) prepared by the support application 211 to the controller 6a through the second bus 5. The controller 6a stores the received information indicating the logical address space into the NAND memory 7.

(6) The internal data storing unit 621 reads the internal data stored in the private area 72. The internal data storing unit 621 then writes the read internal data into storage locations of the user area 71.

(7) The controller 6a identifies the LBAs (LBA 3, LBA 5, LBA 12) mapped to the write data of the output file written in the user area 71 on the basis of the information that indicates the logical address space and is received through the second bus 5 and stored in the NAND memory 7. The controller 6a associates the identified LBAs (the LBA 3, the LBA 5, the LBA 12) to the respective storage locations where the internal data is written. The L2P table 81 updates the stored correspondence relationships between the PBA and the LBA.

As a result, when one or more read commands that designate the LBAs (the LBA 3, the LBA 5, the LBA 12) mapped to the output file is received from the host 2, the controller 6a reads the internal data from the user area 71. The controller 6a then transmits the read internal data to the host 2 as a response to the received read commands.

Next, a procedure of an operation to provide the internal data to the host 2 will be described. FIG. 9 is a sequence diagram illustrating a procedure of an internal data provision operation that is executed in the memory system 3a according to the second embodiment.

The host 2 executes the same processing as the processing of S101 and S102 in FIG. 6 (S201, and S202). Here, the write data associated with the issued write command is dummy data.

When the first interface 611 of the memory system 3a receives the write command from the host 2, the controller 6a of the memory system 3a executes, on the basis of the received write command, writing of the write data (dummy data) associated with the received write command (S203). The controller 6a writes the dummy data associated with the write command into one or more storage locations in the user area 71. The controller 6a maps one or more LBAs designated by the write command to the one or more storage locations where the dummy data has been written.

The host 2 notifies the memory system 3a of the one or more LBAs designated by the write command through the second bus 5 (S204). That is, the host 2 transmits LBA information that indicates the logical address space mapped to the created output file, to the memory system 3a through the second bus 5.

When the second interface 612 of the memory system 3a has received the LBA information from the host 2, the controller 6a stores the received LBA information to the NAND memory 7 (S205). The controller 6a writes the received LBA information into the private area 72, for example.

The controller 6a sets the flag to a predetermined value (S206). The controller 6a manages the flag to be referred to at the time of starting of the memory system 3a. When the predetermined value is set as the flag referred to, the controller 6a transitions to the internal data storing mode in which internal data is written into the user area 71. The flag may be stored in the NAND memory 7.

According to a manual operation, power supply to the memory system 3a is cut off (S207).

According to a manual operation, the power supply to the memory system 3a is resumed (S208).

The controller 6a refers to the flag (S209). Here, the controller 6a confirms that the predetermined value is set as the flag, and transitions the memory system 3a to the internal data storing mode.

The controller 6a reads the LBA information stored in S205 (S210). On the basis of the read LBA information, the controller 6a identifies the logical address space mapped to the dummy data of the output file.

The controller 6a writes internal data into one or more storage locations of the user area 71 (S211). At this time, the controller 6a reads the internal data from the private area 72. The controller 6a writes the read internal data into the user area 71.

The controller 6a maps the one or more LBAs, which are indicated by the LBA information read in S210, to the one or more storage locations of the user area 71 where the internal data has been written in S211 (S212).

The controller 6a resets the flag (S213). That is, the controller 6a sets the value of the flag to an initial value.

The controller 6a and the host 2 then execute the same processing as the processing of S110 to S112 in FIG. 6 (S214 to S216).

Figure 10:
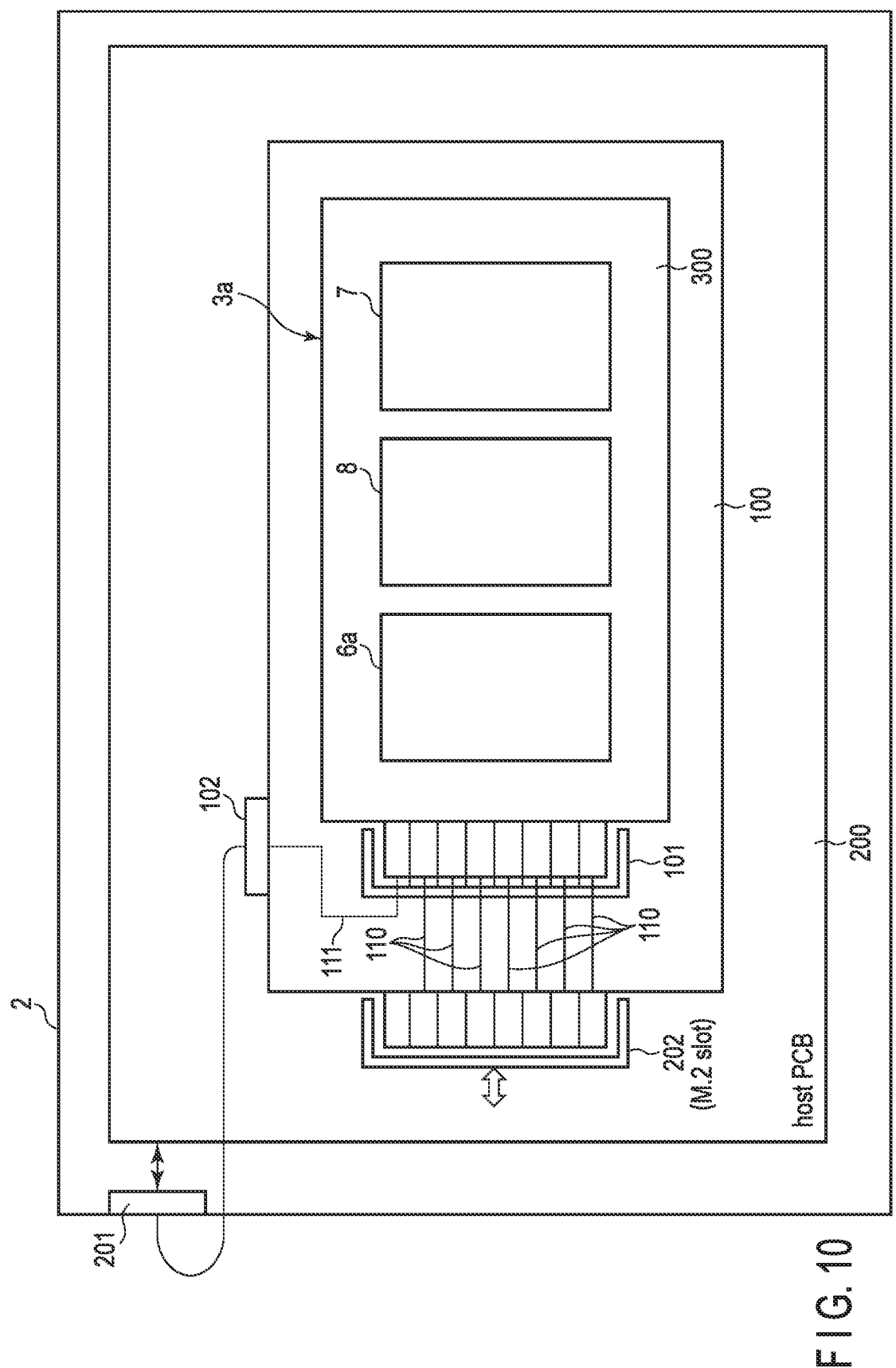
FIG. 10 illustrates an example of a configuration of a jig that connects the memory system according to the second embodiment to a host.

Next, a jig for connecting the memory system 3a to the host 2 will be described. FIG. 10 illustrates an example of a configuration of a jig that connects the memory system 3a according to the second embodiment to the host 2.

The jig 100 includes a substrate that connects the memory system 3a to the host 2. The substrate of the jig 100 is attached to a slot 202 provided in a printed circuit board (host PCB) 200 of the host 2. The slot 202 is, for example, a slot (M.2 slot) that conforms to the PCIe M.2 standard. The jig 100 includes a slot 101 in which the memory system 3*a* is attached, and a port 102.

A substrate 300 of the memory system 3*a* is attached to the slot 101. The controller 6*a*, the NAND memory 7, and the DRAM 8 are mounted on the substrate 300 of the memory system 3*a*. Further, the substrate 300 includes a plurality of signal terminals for a PCIe interface and some signal terminals for an UART interface. While the substrate 300 of the memory system 3*a* is attached to the slot 101, the signal terminals for the PCIe interface of the memory system 3*a* are connected to the slot 202 provided in the host PCB 200 of the host 2 through lines 110 provided in the substrate of the jig 100. The signal terminals for the UART interface of the memory system 3*a* are also connected to the port 102 via lines 111 provided in the substrate of the jig 100.

The port 102 is connected to a port 201 of the host 2 through a cable for a serial interface, for example. The port 102 and the port 201 are, for example, USB ports. The memory system 3*a* and the host 2 are connected by the port 102 and the port 201 so as to be capable of executing out-of-band communication that conforms to the UART standard.

As described above, according to the second embodiment, the memory system 3*a* can efficiently provide internal data to the host 2 by communication in accordance with I/O commands, on the basis of an LBA which is acquired by using the out-of-band communication.

The communication speed of the out-of-band communication (for example, communication using UART) is slower than that of the in-band communication (for example, communication using a PCIe interface). Therefore, when the internal data is transmitted to the host 2 by using the out-of-band communication, it takes a long time to transmit the internal data. In the second embodiment, similarly to the first embodiment, the memory system 3*a* writes the internal data to the user area 71, thus enabling the host 2 to acquire the internal data from the memory system 3*a* by using the in-band communication.

The information indicating the logical address space mapped to the output file is sufficiently smaller in size than the internal data. Therefore, notification of the logical address space using the out-of-band communication can be immediately completed.

Third Embodiment

Next, the third embodiment will be described. An example of a configuration of a memory system 3*b* according to the third embodiment is the same as that of the memory system 3 according to the first embodiment described in FIG. 1. Therefore, a description of an example of a configuration of the memory system 3*b* will be omitted.

Figure 11:
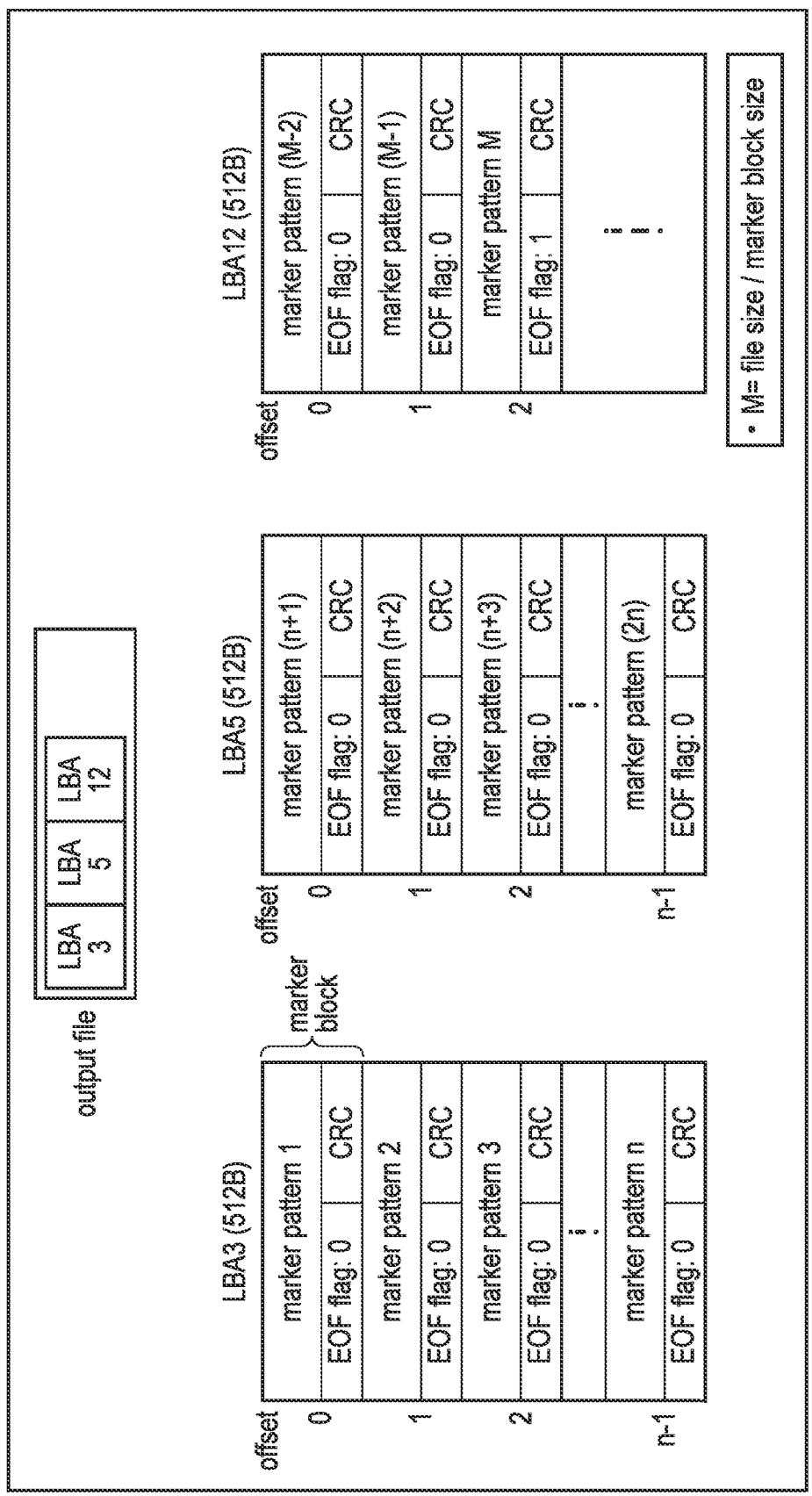
FIG. 11 illustrates an example of an output file used in a memory system according to a third embodiment.

First, marker data will be described. FIG. 11 illustrates an example of an output file used in a memory system 3*b* according to the third embodiment. In the third embodiment, the host 2 creates marker data when creating an output file. The marker data is data including specific pattern data.

In FIG. 11, the host 2 creates an output file mapped to a logical address space which includes an LBA 3, an LBA 5, and an LBA 12. The host 2 then creates marker data to be written in the output file, that is, marker data corresponding to each LBA included in the logical address space.

Upon having created the marker data, the host 2 issues, to the memory system 3*b*, a write command for writing the created marker data into the memory system 3*b*. The memory system 3*b* that has received this write command writes the marker data into one or more storage locations of the user area 71 of the NAND memory 7. The memory system 3*b* then maps one or more LBAs designated by the received write command to the respective storage locations where the marker data is written. The controller 6*b* of the memory system 3*b* finds, from the user area 71, storage locations each storing data that matches pattern data of marker data. The controller 6*b* then identifies a set of LBAs that are mapped to the found storage location, respectively, as the logical address space mapped to the output file.

In FIG. 11, the host 2 creates n marker blocks as the marker data corresponding to the first LBA (here, the LBA 3) mapped to the output file. FIG. 11 illustrates an example in which the data size corresponding to one LBA is 512B.

Each marker block includes a marker pattern, an end of file (FOE) flag, and a cyclic redundancy code (CRC).

The marker pattern is, for example, hashed information. The marker pattern includes information obtained by hashing data which includes information indicating a sequential number different from each marker block. For example, the marker pattern n includes pattern data created by hashing data including information indicating the sequential number n. The details of the marker pattern will be described later. Note that the marker pattern at least includes information that does not cause matching with the user data. Therefore, the information included in the marker pattern need not be hashed information.

The EOF flag is a flag indicating whether the marker block indicated by the EOF flag is the last marker block among the marker blocks written into the output file. For example, the EOF flag of each marker block other than the last marker block is set to an initial value (for example, 0). The EOF flag of the last marker block is set to a predetermined value (for example, 1).

Further, the host 2 creates n marker blocks as marker blocks corresponding to the next LBA (here, the LBA 5) mapped to the output file.

In addition, the host 2 creates, for example, three marker blocks as marker blocks corresponding to the next LBA (here, the LBA 12) mapped to the output file.

As illustrated in FIG. 11, the host 2 creates M marker blocks. M is the quotient of the size of the created output file and the size of a marker block. That is, the number of marker blocks included in the output file is M.

Here, the value of the EOF flag included in the last marker block is 1.

Next, the marker pattern will be described. FIG. 12 illustrates an example of a marker pattern that is used in the memory system 3*b* according to the third embodiment. The marker pattern is unique data that does not match with any user data.

The host 2 and the memory system 3*b* create a marker pattern by using a combination of information known by both the host 2 and the memory system 3*b* (for example, a serial number which is identification information of the memory system 3*b*), and a consecutive number of the marker pattern.

Here, a method of creating a marker pattern 1 will be described.

First, the serial number (for example, AB112233440) of the memory system 3*b* and a marker pattern consecutive number (0001) are hashed to create pattern data (for example, OMMNDIU6$ #EAOK). The hashing method is common between the host 2 and the memory system 3*b*. Therefore, the host 2 and the memory system 3*b* are capable of creating the same pattern data when hashing the same information.

Then, k pieces (for example, four pieces) of pattern data (for example, OMMNDIU6$ #EAOK) are arranged to create a marker pattern. The arranged pieces are used as one marker pattern.

Next, a pattern table will be described. FIG. 13 illustrates a pattern table that is used in the memory system 3b according to the third embodiment.

The pattern table is a table that stores all the M marker patterns and information relating to logical addresses where marker blocks that include the marker patterns, respectively, are stored. The pattern table is created by the memory system 3b when executing a scanning operation of the marker patterns.

The pattern table has M entries. Each of the entries includes a "pattern number" field, a "marker pattern" field, and a "location" field.

The pattern number is information indicating a consecutive number of a corresponding marker pattern. The pattern table in FIG. 13 has an entry that stores information indicating each of consecutive numbers 1 to M that correspond to the marker patterns in FIG. 11, respectively. The memory system 3b creates entries up to the consecutive number (for example, M) which corresponds to the maximum number of pieces of pattern data that can be created by the host 2.

The marker pattern includes pattern data that is hashed information. The pattern data corresponds to the pattern number. The pattern data is data obtained by hashing information which includes identification information (for example, a serial number) of the memory system 3b and a corresponding pattern number.

The location is information indicating a logical address and an offset, that are associated with a marker block which includes a corresponding marker pattern.

The controller 6b of the memory system 3b according to the third embodiment reads data that is stored in the user area 71 at predetermined timing. When the read data includes data matching one of the marker patterns stored in the pattern table, the controller 6b identifies a logical address mapped to the storage location where the read data is stored. The memory system 3b then stores the identified logical address into the entry in the pattern table as the location corresponding to the marker pattern.

The controller 6b may store, into the NAND memory 7, a set of LBAs designated by a set of write commands received at a newer time point, as a list of high priority LBAs. The controller 6b can detect a marker pattern earlier by preferentially reading data from storage locations to which the high priority LBAs are mapped. At this time, every time a write command is received from the host 2, the controller 6b stores, into the NAND memory 7, one or more LBAs designated by the received write command as the list of high priority LBAs. An upper limit value may be set for the number of LBAs stored as the high priority LBAs. When a new high priority LBA is stored and then the total number of the stored high priority LBAs exceeds the upper limit value, the controller 6b deletes an LBA stored at the oldest timing among the high priority LBAs, from the list of the high priority LBAs.

In the pattern table illustrated in FIG. 13, a case is assumed where M marker blocks are written to the LBA 3, the LBA 5, and LBA 12 as illustrated in FIG. 11.

The marker block corresponding to the marker pattern 1, which includes the pattern data whose pattern number is 1, is located at the head of the 512B data corresponding to the LBA 3. That is, the offset is 0. Therefore, the location corresponding to the pattern number 1 is indicated by a combination of the LBA 3 and 0.

The marker block corresponding to a marker pattern 2, which includes pattern data whose pattern number is 2, is located second from the head of the 512B data corresponding to the LBA 3. That is, because there is the one marker block before this marker block in the LBA 3, the offset is 1. The location corresponding to the pattern number 2 is indicated by a combination of the LBA 3 and 1.

The marker block corresponding to a marker pattern 3, which includes pattern data whose pattern number is 3, is located third from the head of the 512B data corresponding to the LBA 3. That is, because there are the two marker blocks before this marker block in the LBA 3, the offset is 2. The location corresponding to the pattern number 3 is indicated by a combination of the LBA 3 and 2.

The marker block corresponding to a marker pattern 4, which includes pattern data whose pattern number is 4, is located fourth from the head of the 512B data corresponding to the LBA 3. That is, because there are the three marker blocks before this marker block in the LBA 3, the offset is 3. The location corresponding to the pattern number 4 is indicated by a combination of the LBA 3 and 3.

The marker block corresponding to a marker pattern M, which includes pattern data whose pattern number is M, is located third from the head of the 512B data corresponding to LBA 12. That is, because there are two marker blocks before this marker block in the LBA 12, the offset is 2. The location corresponding to the pattern number M is indicated by a combination of the LBA 12 and 2.

Thus, the controller 6b determines that detection of pattern data is successful when a condition that (1) entries from the first entry in the pattern table each store information indicative of a location without including any entry that does not store information indicative of a location and (2) an EOF flag of a marker block that includes the end pattern data (i.e., pattern data corresponding to the last entry of the entries) is 1, is satisfied.

Figure 14:
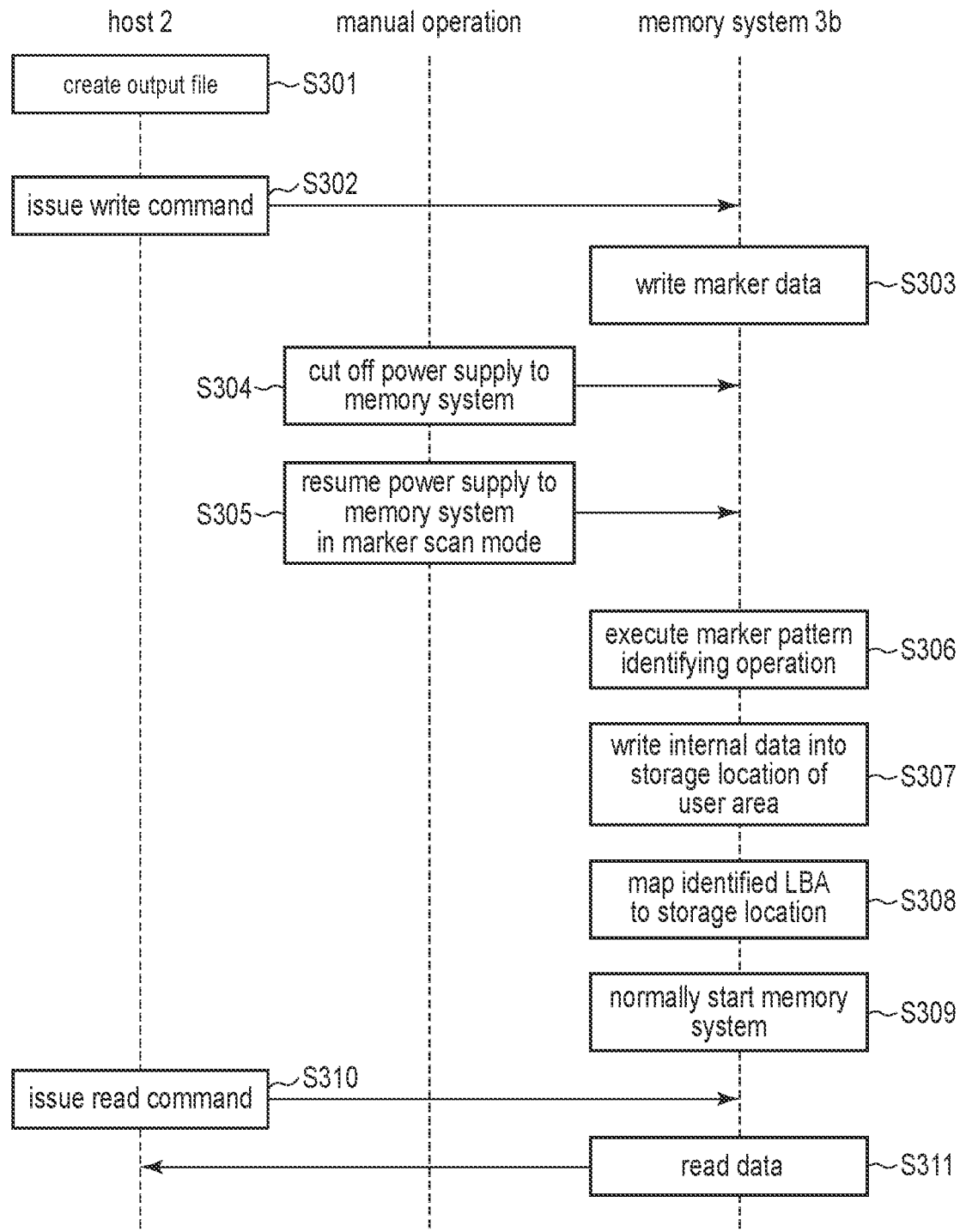
FIG. 14 is a sequence diagram illustrating a procedure of an internal data provision operation that is executed in the memory system according to the third embodiment.

Next, a procedure of an operation to provide internal data to the host 2 will be described. FIG. 14 is a sequence diagram illustrating a procedure of an internal data provision operation that is executed in the memory system 3b according to the third embodiment.

The host 2 executes the same processing as the processing of S101 and S102 in FIG. 6 (S301, and S302). Here, the write data associated with the issued write command is marker data which includes one or more marker patterns.

The controller 6b of the memory system 3b executes writing of the write data (marker data) associated with the write command on the basis of the received write command (S303). The controller 6b writes the marker data associated with the write command into one or more storage locations in the user area 71. The controller 6b maps one or more LBAs that are designated by the write command, to the one or more storage locations, respectively to update the L2P table 81.

According to a manual operation, the power supply to the memory system 3b is cut off (S304).

The power supply to the memory system 3b is resumed in accordance with a predetermined manual operation that designates a marker scan mode (S305). For example, when power is supplied to the memory system 3b while a switch on a substrate of the memory system 3b is turned on in accordance with the manual operation, the controller 6b transitions to the marker scan mode.

The controller 6b executes an operation to identify a marker pattern by scanning the user area 71 (S306). Specifically, the controller 6b identifies one or more storage locations each storing data matching a marker pattern (or marker patterns) of the marker data. The controller 6b then identifies one or more LBAs that are mapped to the identified one or more storage locations, as a logical address space mapped to the output file. In this case, the controller 6b creates a pattern table and scans the user area 71 to identify the logical address space mapped to the output file. The details of the operation of S306 will be described later.

The controller 6b writes internal data to one or more storage locations of the user area 71 (S307). At this time, the controller 6b reads internal data from the private area 72. The controller 6b writes the read internal data to one or more storage locations of the user area 71.

The controller 6b maps the one or more LBAs, which are included in the logical address space identified in S306, to the one or more storage locations where the internal data has been written in S307 (S308), and updates the L2P table 81.

The controller 6b and the host 2 then execute the same processing as the processing of S110 to S112 in FIG. 6 (S309 to S311).

Figure 15:
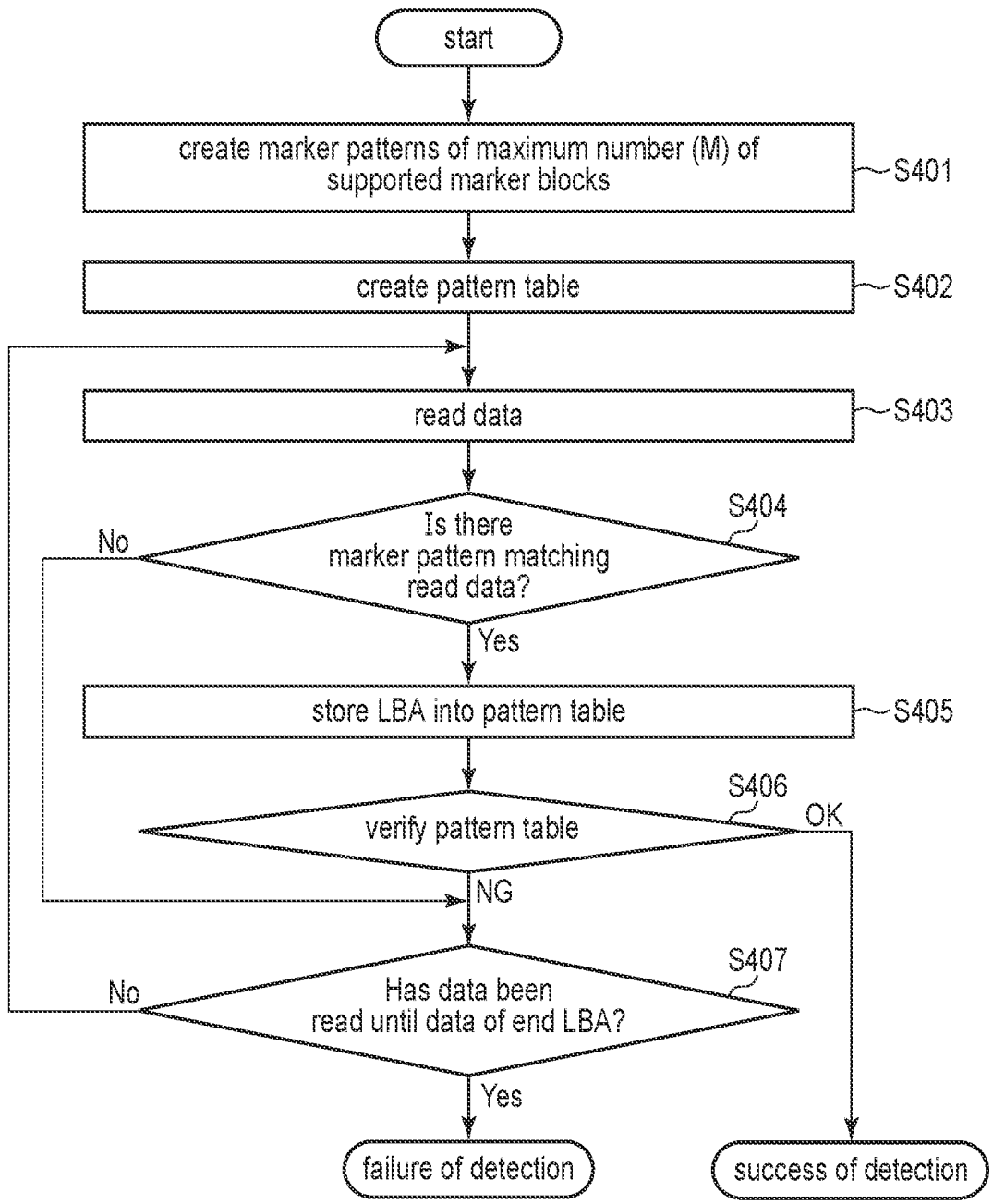
FIG. 15 is a flowchart illustrating a procedure of a marker pattern identifying operation that is executed in the memory system according to the third embodiment.

Next, a procedure of an operation to identify a marker pattern that corresponds to S306 of FIG. 14 will be described. FIG. 15 is a flowchart illustrating a procedure of a marker pattern identifying operation that is executed in the memory system 3b according to the third embodiment.

The controller 6b creates M marker patterns (S401). M is an example of the maximum number of marker blocks supported by the memory system 3b.

The controller 6b creates a pattern table (S402). For example, the controller 6b creates a pattern table that stores the marker patterns created in S401.

The controller 6b reads data from the user area 71 (S403).

The controller 6b determines whether there is a marker pattern matching the read data (S404). The controller 6b determines whether there is a marker pattern which matches the read data among the marker patterns stored in the pattern table.

When there is a marker pattern matching the read data (Yes in S404), the controller 6b stores an LBA corresponding to the read data into the pattern table (S405). The controller 6b stores, into the pattern table, information indicating a location where the read data is stored.

The controller 6b verifies the pattern table (S406). The controller 6b determines whether or not a condition that (1) entries from the first entry in the pattern table each store information indicative of a location without including any entry that does not store information indicative of a location and (2) an EOF flag of a marker block that includes the end pattern data is 1, is satisfied.

When the condition is satisfied (OK in S406), the controller 6b determines that detection of marker patterns has succeeded and ends the marker pattern identifying operation (success of detection).

When there is no marker pattern matching the data read from the user area 71 (No in S404) or when the condition is not satisfied (NG in S406), the controller 6b determines whether or not data has been read until data corresponding to the end LBA (S407).

When there is data that has not yet been read (No in S407), the controller 6b reads the next data (S403).

When data has been read until data corresponding to the end LBA (Yes in S407), the controller 6b determines that detection of marker patterns has failed and ends the marker pattern identifying operation (failure of detection).

Figure 16:
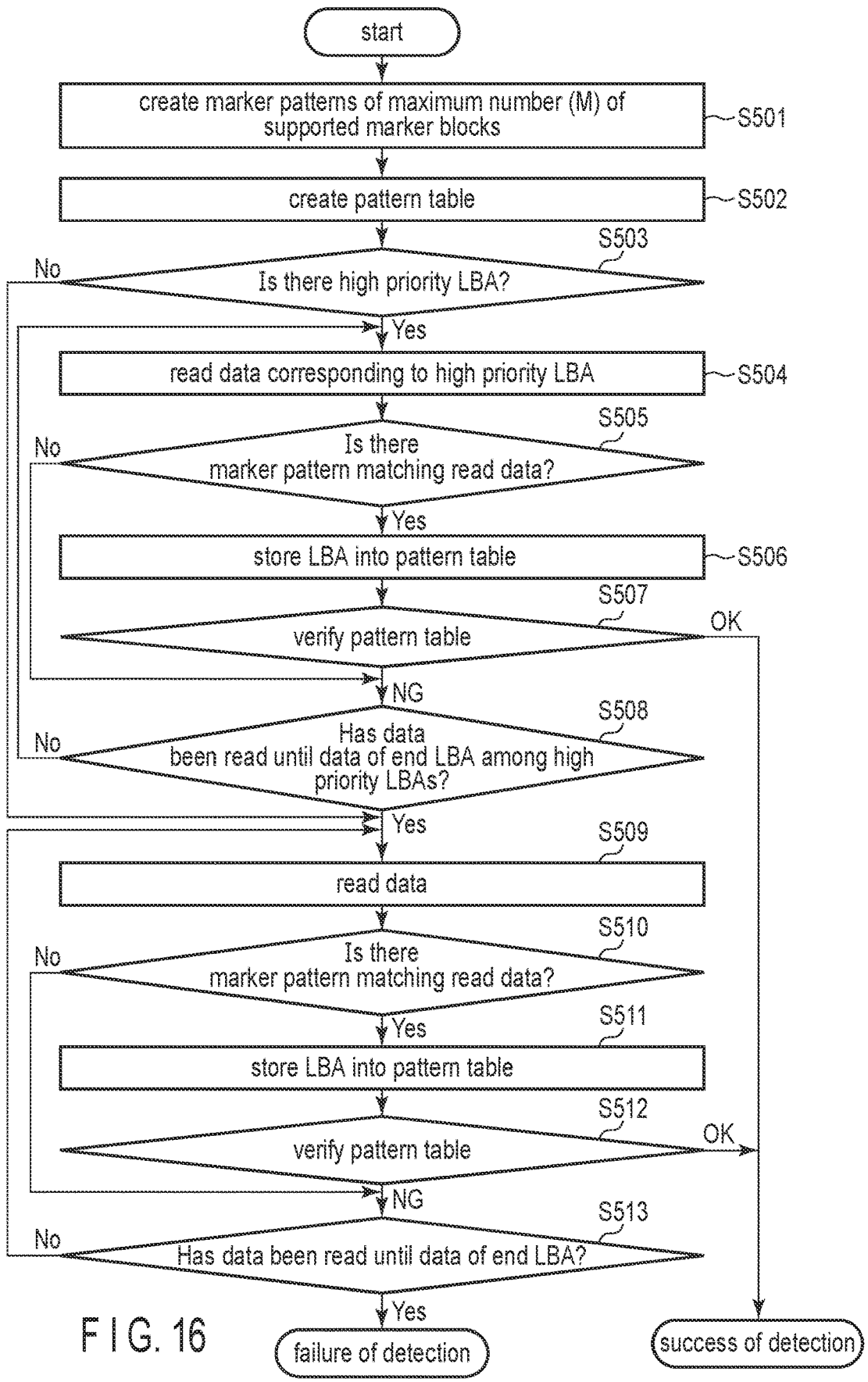
FIG. 16 is a flowchart illustrating another procedure of the marker pattern identifying operation that is executed in the memory system according to the third embodiment.

Next, a procedure of a marker pattern identifying operation in a case where the memory system 3b stores high priority LBAs will be described. FIG. 16 is a flowchart illustrating another procedure of the marker pattern identifying operation that is executed in the memory system 3b according to the third embodiment.

The controller 6b executes the same processing as S401 and S402 in FIG. 15 (S501 and S502).

The controller 6b determines whether there is one or more high priority LBAs (S503). The controller 6b determines whether any LBA has been stored as a high priority LBA.

When there is one or more high priority LBAs (Yes in S503), the controller 6b reads data corresponding to one of the high priority LBAs (S504). The controller 6b selects an LBA having the latest stored timing from the high priority LBAs. The controller 6b reads data from a storage location corresponding to the selected LBA.

The controller 6b determines whether there is a marker pattern matching the read data (S505). The controller 6b determines whether there is a marker pattern which matches the read data among the marker patterns stored in the pattern table.

When there is a marker pattern which matches the read data (Yes in S505), the controller 6b stores, in the pattern table, the LBA corresponding to the read data (S506). The controller 6b stores, in the pattern table, information indicating a location where the read data is stored.

The controller 6b verifies the pattern table (S507). The controller 6b determines whether or not that (1) each of entries stores information indicative of a location without including any entry that does not store information indicative of a location between the first entry in the pattern table to the end entry in the pattern table and (2) an EOF flag of a marker block that includes the end pattern data (i.e., pattern data corresponding to the last entry of the entries) is 1, is satisfied.

When the condition is satisfied (OK in S507), the controller 6b determines that detection of marker patterns has succeeded and ends the marker pattern identifying operation (success of detection).

When there is no marker pattern matching the data read from the storage location corresponding to the selected LBA (No in S505) or when the condition is not satisfied (NG in S507), the controller 6b determines whether or not data has been read until data corresponding to the end LBA among the high priority LBAs (S508).

When there is data that has not yet been read among data corresponding to the high priority LBAs (No in S508), the controller 6b reads data corresponding to the next data (S504).

When data has been read until data corresponding to the end LBA among the high priority LBAs (Yes in S508) or when there is no high priority LBA (No in S503), the controller 6b reads data corresponding to LBAs other than the high priority LBAs from the user area 71 (S509).

The controller 6b then executes the same processing as S404 to S407 in FIG. 15 (S510 to S513).

Figure 17:
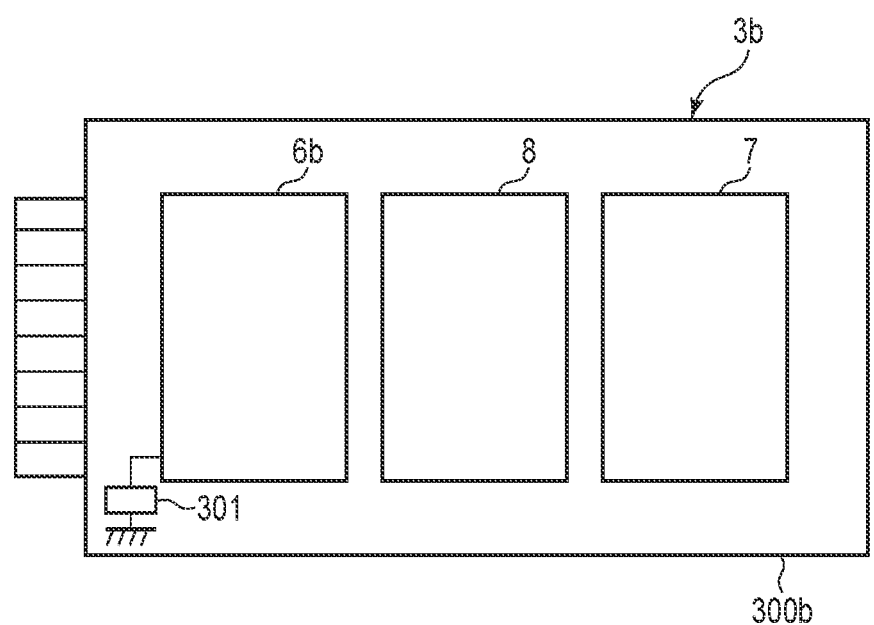
FIG. 17 is a diagram illustrating a substrate of the memory system according to the third embodiment and a switch that is provided on the substrate.

Next, a switch 301 that is provided on a substrate 300b of the memory system 3b according to the third embodiment will be described. FIG. 17 is a diagram illustrating a configuration of the memory system 3b according to the third embodiment.

Components of the substrate 300b of the memory system 3b according to the third embodiment are almost the same as those of the substrate 300 of the memory system 3a according to the second embodiment described in FIG. 10. Here, a description will be provided focusing on differences from the components described in FIG. 10.

The substrate 300b of the memory system 3b according to the third embodiment includes the switch 301 for detecting of starting in the marker scan mode. The switch 301 may be switched on/off in accordance with a manual operation. For example, when the switch 301 is on, a specific I/O pin of the controller 6b is connected to a ground terminal via the switch 301. The ground terminal is a terminal to which a voltage of a reference potential is applied while the controller 6b is operating. When power supply to the memory system 3b is resumed and the controller 6b has detected that the specific I/O pin is grounded, the controller 6b transitions the memory system 3b to the marker scan mode. By using the marker scan mode, the user area 71 can be scanned in a state where there is no access from the host 2.

As described above, according to the memory system 3b of the third embodiment, the controller 6b identifies the logical address space by identifying the marker patterns which are data having specific pattern data. Therefore, the controller 6b can efficiently provide the internal data to the host 2 by using communication in accordance with I/O commands.

Because each marker pattern is hashed data, there is a low probability of data which has been written in accordance with another write command being erroneously determined to be a marker pattern.

In addition, the host 2 may perform an operation to change a logical address space mapped to a file in order to eliminate fragmentation. In this case, if writing of marker patterns has been executed and then the memory system 3b is maintained in an operating state of being capable of processing I/O commands from the host 2, new data corresponding to an LBA which corresponds to the written marker patterns may be written to the NAND memory 7 in accordance with a write command designating the LBA from the host 2. In this case, the correspondence relationship between the marker patterns and the logical address space is unmapped. As a result, the controller 6b can no longer identify the logical address space corresponding to the marker patterns. With the memory system 3b according to the third embodiment, because the power supply to the memory system 3b is cut off after the writing of the marker patterns, it is possible to prevent a new write command designating the LBA corresponding to the written marker pattern from being received.

In addition, when the memory system 3b is started by resuming the power supply, there is a high probability that a set of LBAs corresponding to the marker patterns is a set of LBAs written immediately before the power supply is cut off. Therefore, it is assumed that the logical address space mapped to the output file is stored as high priority LBAs. Accordingly, the controller 6b enables the time required for the operation to identify the marker patterns to be shortened by scanning data in order starting from data corresponding to the high priority LBAs.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system that is connectable to a host, the memory system comprising:
    a nonvolatile memory that includes a first storage area and a second storage area, the first storage area storing user data based on a command that designates a logical address from the host, the second storage area storing management data; and
    a controller configured to control the nonvolatile memory, wherein
    the controller is configured to:
    write first data into the first storage area in accordance with a first write command from the host;
    identify a logical address mapped to the written first data;
    read, from the second storage area, internal data that is included in the management data and is generated by the controller;
    write the read internal data into a first storage location of the first storage area;
    associate the first storage location with the identified logical address;
    read the internal data from the first storage location in response to receiving, from the host, a read command that designates the identified logical address; and
    transmit, to the host, the internal data read from the first storage location.

2. The memory system according to claim 1, wherein the controller comprises:
    a first interface circuit configured to receive the command from the host through a first bus; and
    a second interface circuit configured to communicate with the host through a second bus that is different from the first bus, wherein
    the controller is further configured to:
    when the first interface circuit receives the first write command from the host through the first bus, write dummy data that is included in the first data into the first storage area; and
    when the second interface circuit receives first information indicating a logical address mapped to the dummy data from the host through the second bus, identify the logical address based on the received first information.

3. The memory system according to claim 2, wherein the controller is further configured to:
    when the second interface circuit receives the first information from the host through the second bus, write the first information to the nonvolatile memory; and
    set a first flag to a first value to store the first flag into the nonvolatile memory.

4. The memory system according to claim 3, wherein the controller is further configured to:
    when power supply to the memory system is resumed after the power supply to the memory system is cut off, refer to the value of the first flag; and
    when the first value is set as the first flag,
    read the first information stored in the nonvolatile memory,
    identify the logical address mapped to the dummy data based on the first information, and
    execute an operation of reading the internal data from the second storage area, an operation of writing the read internal data into the first storage location, and an operation of associating the first storage location with the logical address mapped to the dummy data.

5. The memory system according to claim 1, wherein the controller is further configured to:
    in response to receiving the first write command from the host,
    write the first data that includes a plurality of pieces of pattern data into the first storage area; and
    create a pattern table that stores the plurality of pieces of pattern data.

6. The memory system according to claim 5, wherein the controller is further configured to:
- detect a second storage location of the first storage area where data matching a piece of pattern data among the plurality of pieces of pattern data in the pattern table is stored by scanning the first storage area; and
- identify the logical address in accordance with a logical address that is associated with the detected second storage location.

7. The memory system according to claim 6, wherein the controller is further configured to:
- store a logical address designated by a write command received from the host into the nonvolatile memory as a list of logical addresses;
- when a number of the stored logical addresses exceeds a threshold, delete a logical address associated with an oldest received write command from the list of logical addresses;
- detect the second storage location where data matching the piece of pattern data among the plurality of pieces of pattern data in the pattern table is stored among a plurality of storage locations by scanning the plurality of storage locations, a plurality of logical addresses stored in the list of logical addresses being mapped to the plurality of storage locations, respectively; and
- identify the logical address in accordance with a logical address that is associated with the detected second storage location.

8. The memory system according to claim 6, wherein the first data includes a plurality of marker blocks, and each of the plurality of marker blocks includes two or more of the pieces of the pattern data, and a flag.

9. The memory system according to claim 8, wherein the piece of pattern data is created in accordance with identification information of the memory system, and information indicative of a number corresponding to a marker block which includes the piece of pattern data.

10. The memory system according to claim 8, wherein the flag indicates whether or not the marker block is data at an end of the plurality of pieces of pattern data.

11. A control method for controlling a memory system connectable to a host, the memory system comprising a nonvolatile memory and a controller configured to control the nonvolatile memory, the nonvolatile memory including a first storage area and a second storage area, the first storage area storing user data based on a command that designates a logical address, the second storage area storing management data,
the control method comprising:
- writing first data into the first storage area in accordance with a first write command from the host;
- identifying a logical address mapped to the written first data;
- reading, from the second storage area, internal data that is included in the management data and is generated by the controller;
- writing the read internal data into a first storage location of the first storage area;
- associating the first storage location with the identified logical address;
- reading the internal data from the first storage location in response to receiving, from the host, a read command that designates the identified logical address; and
- transmitting, to the host, the internal data read from the first storage location.

12. The control method according to claim 11, further comprising:
- when the first write command is received from the host by a first interface circuit through a first bus, writing dummy data included in the first data into the first storage area; and
- when first information indicating the logical address is received from the host by a second interface circuit through a second bus that is different from the first bus, identifying a logical address mapped to the dummy data based on the received first information, the second interface circuit being different from the first interface circuit.

13. The control method according to claim 12, further comprising:
- when the first information is received from the host by the second interface circuit through the second bus, writing the first information to the nonvolatile memory; and
- setting a first flag to a first value to store the first flag into the nonvolatile memory.

14. The control method according to claim 13, further comprising:
- when power supply to the memory system is resumed after the power supply to the memory system is cut off, referring to the value of the first flag; and
- when the first value is set as the first flag,
- reading the first information stored in the nonvolatile memory,
- identifying the logical address mapped to the dummy data based on the first information, and
- executing an operation of reading the internal data from the second storage area, an operation of writing the read internal data into the first storage location, and an operation of associating the first storage location with the logical address mapped to the dummy data.

15. The control method according to claim 11, further comprising:
- in response to receiving the first write command from the host,
- writing the first data that includes a plurality of pieces of pattern data into the first storage area; and
- creating a pattern table that stores the plurality of pieces of pattern data.

16. The control method according to claim 15, further comprising:
- detecting a second storage location of the first storage area where data matching a piece of pattern data among the plurality of pieces of pattern data in the pattern table is stored by scanning the first storage area; and
- identifying the logical address in accordance with a logical address that is associated with the detected second storage location.

17. The control method according to claim 16, further comprising:
- storing a logical address designated by a write command received from the host into the nonvolatile memory as a list of logical addresses;
- when a number of the stored logical addresses exceeds a threshold, deleting a logical address associated with an oldest received write command from the list of logical addresses;
- detecting the second storage location where data matching the piece of pattern data among the plurality of pieces of pattern data in the pattern table is stored among a plurality of storage locations by scanning the plurality of storage locations, a plurality of logical addresses stored in the list of logical addresses being mapped to the plurality of storage locations, respectively; and identifying the logical address in accordance with a logical address that is associated with the detected second storage location.

18. The control method according to claim 16, wherein the first data includes a plurality of marker blocks; and each of the plurality of marker blocks includes two or more of the pieces of the pattern data, and a flag.

19. The control method according to claim 18, wherein the piece of pattern data is created in accordance with identification information of the memory system, and information indicative of a number corresponding to a marker block which includes the piece of pattern data.

20. The control method according to claim 18, wherein the flag indicates whether or not the marker block is data at an end of the plurality of pieces of pattern data.

* * * * *